March 3, 1964  P. NOFER ETAL  3,122,868
METHODS AND APPARATUS RELATING TO CLOSURES
Filed Aug. 22, 1961  4 Sheets-Sheet 1
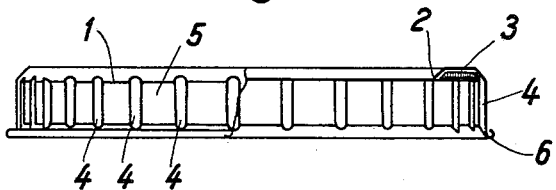
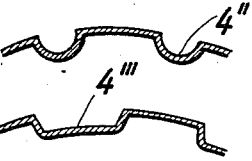
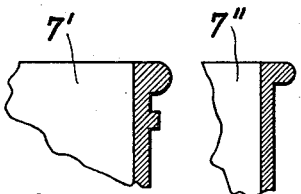
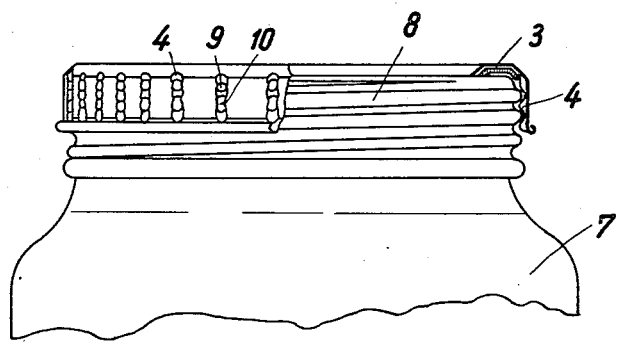

March 3, 1964  P. NOFER ETAL  3,122,868
METHODS AND APPARATUS RELATING TO CLOSURES
Filed Aug. 22, 1961  4 Sheets-Sheet 2
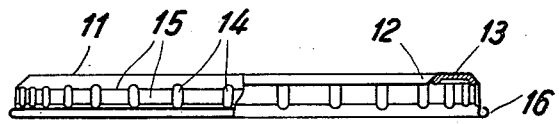
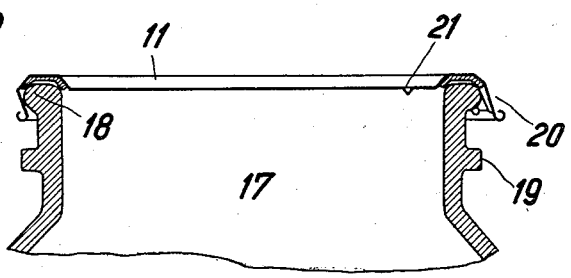
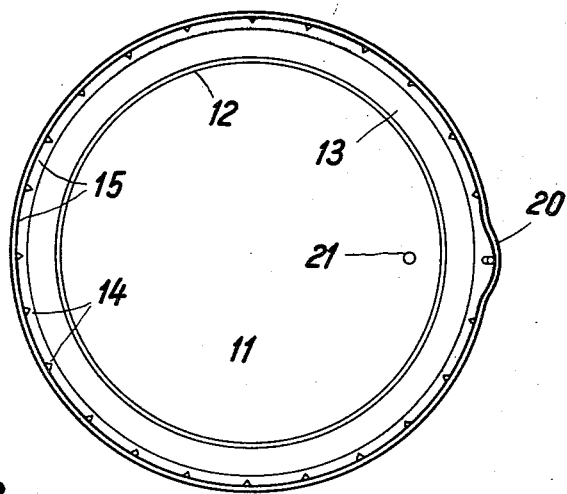
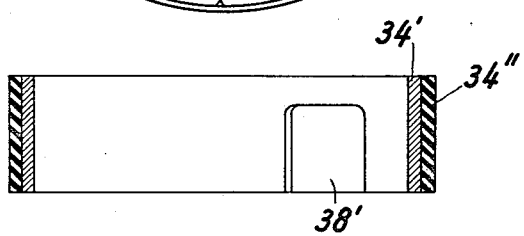

March 3, 1964  P. NOFER ETAL  3,122,868
METHODS AND APPARATUS RELATING TO CLOSURES
Filed Aug. 22, 1961

United States Patent Office 3,122,868
Patented Mar. 3, 1964

3,122,868
METHODS AND APPARATUS RELATING TO CLOSURES
Paul Nofer and Heinrich Eberhardt, both of Schoofstr. 6, Brunsbuttelkoog, Germany
Filed Aug. 22, 1961, Ser. No. 134,049
Claims priority, application Germany Apr. 20, 1959
10 Claims. (Cl. 53—42)

This invention relates to closure covers for containers of the type having a wide neck and/or a large opening, and which are formed of a substantially rigid material such as glass, sheet metal or synthetic plastic material, and which are suitable, for example, for accommodating preserved foods or conserves. This application is a continuation-in-part of my copending application Ser. No. 23,050, filed April 18, 1960.

It is conventional to use a pre-fabricated, substantially cap-shaped metal cover, provided with a packing liner if necessary, and consisting of thin, soft substantially non-elastic sheet metal, whose side wall in the close position of the cover is subjected to radial pressure and is adapted to be deformed to adapt itself approximately to the shape of the outer wall of the cover.

A principal object of the invention is to provide a closure cover of the above noted kind which is particularly adapted for universal use inasmuch as it is suitable for containers having different outer wall configurations in the vicinity of the mouth of the container.

According to one embodiment of the invention, the side wall of the cap-shaped cover is provided with stamped, vertically or approximately vertically disposed grooves or ribs which are spaced from one another at intervals about the periphery and which are adapted to be deformed partly for adaptation of the cover to the shape of the outer wall of the container. The rim of the side wall of the cover is beaded-over (rolled-over) outside the region of the grooves or ribs.

A closure of this kind has the advantage that the cover, when applied to a container, is held uniformly and securely on the container with uniform tightness, this being achieved through a plurality of fixing points distributed uniformly around the cover periphery and formed by partial deformation of the grooves on beads on the outer wall of the container. Also, the projections of the cover are situated behind a bead on the container.

The container wall can comprise, for example, one or more annular beads. The grooves or ribs of the cover in this case are deformed due to radial forces applied during the sealing operation to the container bead or beads and the ribs may extend below one or more container beads. The container can then be opened by applying a force to slide the cover upwards over the beads.

The container wall may, alternatively, be provided with a single-start or multiple-start external thread. In this case, due to the fact that the grooves or ribs are partly deformed during the sealing operation by the action of radial forces, the closure cover forms a screw-top closure which can be opened and closed repeatedly by turning the cover manually and which grips uniformly and securely over its entire periphery.

A particular advantage of the invention is that the cover adapts itself automatically to any irregularities of the container mouth, and more particularly to deviations from the conventional circular shape, and the cover also adapts itself to unevennesses on the rim of the container mouth.

The pattern formed by the ribs or grooves on the outer side of the side wall of the cover makes the cover particularly easy to grip firmly and this facilitates rotating the cover by hand. There are no sharp edges on the cover rim which might cause hand injuries.

The cover can be applied to the container by first exerting axial pressure on the loosely positioned cover, compressing an inserted packing which may be provided and which bears on the rim of the container mouth, and then by exerting radial pressure on all sides in order to adapt the cover to the shape of the outer wall of the container. The cover can be applied by means of an axially guided and radially yieldable tool (sealing head) which is known per se.

By appropriate selection and arrangement of the packing in the cover, which is placed over the rim of the container mouth, and by suitable choice of the thickness of the sheet metal used for the cover and the kind of sheet metal used, a closure cover according to the invention can be used for all desirable kinds of seals, for example for so-called breathing seals ("vacuum seals") wherein an internal pressure produced by the temperature increase during boiling can be equalized by the escape of air from the inside towards the outside. Air, however, cannot enter in opposite direction from the outside to the inside. The closure can also be used for hermetically sealed closures ("instantaneous seals"), wherein air cannot pass from the inside to the outside nor from the outside to the inside.

In accordance with a further advantageous construction of the closure cover according to the invention for "vacuum sealing," the side wall of the cover when finally mounted on the container comprises at one or more regions distributed uniformly over its periphery a radial swelling ("nose") in the region of which there is situated an area of locally reduced retaining force on the cover periphery and, as a result, there is a preferred yieldable area of the sealing device for equalizing the pressure difference between the interior and the exterior.

A "nose" of this kind affords various advantages: When fixing the cover by the use of radial force, compression of the material in the peripheral direction is avoided, and this is more particularly so in the region of the beading on the cover rim. Furthermore, for boiling the contents of the container, the yieldable area of the cover limits the pressure rise due to the possibility of pressure equalization occurring at a specific excess pressure. Furthermore, the first opening of the cover by hand without the use of a tool is facilitated both as regards containers with and without retaining beads and also as regards containers provided with threading. In all these cases, by rotating the cover by hand and applying a certain amount of force, the vacuum seal can be released easily and without the assistance of a tool. In the case of containers without threading, the first opening of the container can also be effected by gripping the container in both hands so that the thumbs are situated below the cover projection ("nose") and by sliding the said nose upwards by means of the thumbs so that the cover is lifted and the retaining force is overcome.

If there is no thread on the cover, the side wall of the cap-shaped cover provided with the nose or noses can also be made smooth with the grooves or ribs omitted.

The invention is also concerned with a method which permits the formation of the "nose" when applying the cover, a modification of a sealing head, known per se, being used for applying the cover to the container for carrying out the aforesaid method. The invention is also concerned with a special construction of the container in conjunction with the closure cap produced in accordance with the new method for securing the cover against accidental lifting.

The invention will be next explained in greater detail by way of example with reference to the accompanying drawings wherein:

FIG. 1 is a view, partly in section, of a prefabricated cover which is to be used as a closure according to one embodiment of the invention;

FIG. 2 is a view, likewise partly in section, of a finished, screwable closure according to another embodiment of the invention;

FIGS. 3, 4 and 5 are sectional views, on enlarged scale, illustrating various possible shapes for the grooving in the side walls of the cover;

FIGS. 6 and 7 illustrate in section two commonly used container wall configurations with surrounding beads onto which—and also onto the threaded container according to FIG. 2—it is possible to apply identical covers according to the invention;

FIG. 8 shows, partly in section a further prefabricated cover which is shorter than the cover shown in FIG. 1;

FIG. 9 shows in section the upper portion of a container made of rigid material and having a wide mouth, which container is provided with a fully applied closure cover with a nose;

FIG. 10 is a view from below showing the cover with the nose;

FIG. 13 shows further possible constructional forms of the annular strip;

FIG. 14 is a fragmentary view illustrating a modification of the cover of FIG. 8;

Figure 11:
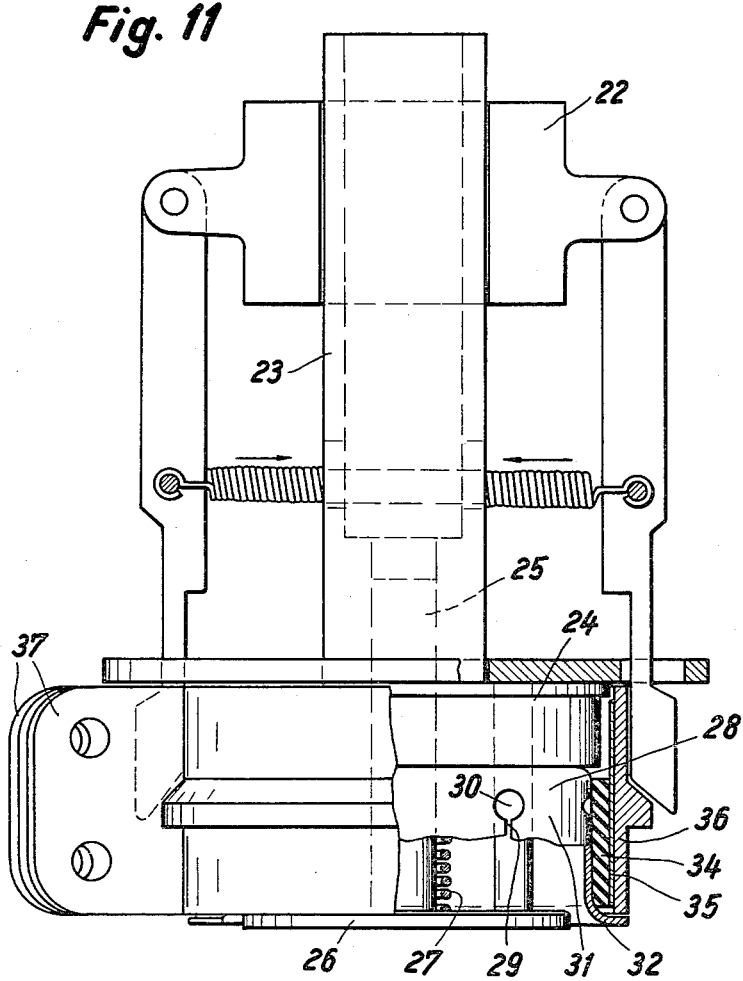
FIG. 11 is a view, partly in section, of the sealing head adapted to be used for effecting the method.

The cover 1 may, but need not, be provided with a central indentation 2 as shown in FIG. 1, which acts as an inner centering means. An annular packing 3 is situated above the rim of the container mouth and consists of a ring of sealing material which is inserted in the cover and can be glued-in, pressed-in, sprayed-in or mechanically secured behind projections. The side wall or depending flange of the cap-shaped cover is provided as shown in FIG. 1 with a ring of stamped grooves 4 between which there remain zones 5 preferably in the form of rectangles. This gives the periphery of the cover a pattern which is handy to grip. The lower rim 6 of the cap-shaped cover is in this case beaded-over externally. It may, also, be beaded-over internally.

When the cover is applied, as FIG. 2 shows, the packing 3 is pressed with axial pressure against the mouth rim of the container 7. Then by simultaneous transmission of radial forces from all sides the mean diameter of the side wall is narrowed or reduced by a combined drawing and compressing operation, in which the vertical grooves 4 also move inwardly and approximately radially. These abut against the projections on the outer wall configuration of the container 7, are locally deformed and thereby form a chain of retaining points 9, 10 distributed about the periphery of the container mouth.

As FIGS. 3 to 5 show, the grooves 10 have a pointed, V-shaped form 4′, an approximately arcuate shape 4″ or a flat shape 4‴. Instead of threading as shown in FIG. 2, the container can also have an encircling, rounded bead 7′ and a squared abutment ring (FIG. 6) or a shape as indicated at 7″, with an encircling, narrow rounded bead (FIG. 7).

In the prefabricated cover 11 of FIG. 8, the parts designated as 12, 13, 14, 15 and 16 correspond to the parts 2, 3, 4, 5, 6 of the cover 1 in FIG. 1. If the beaded-over ring 16 as shown in FIG. 14 is so arranged that the diameter of the bead 16 is equal to or approximately equal to the diameter of the side wall, the cover rim is given increased rigidity even with a shorter side wall in relation to the proportions of the cover according to FIG. 1, i.e. with a particularly low cover.

As FIG. 9 shows, the rigid container 17 is provided at the outer side of the container mouth with a retaining bead 18 of rounded cross-section and a squared abutment 19 which finishes approximately flush with the rim of the cover 11 placed on the container mouth, the beaded-over rim of the said cover being spaced at only a very short distance from the said abutment bead. The radial projection ("nose") 20 of the cover side wall, which is formed when applying the cover in accordance with the method according to the present invention, projects slightly outwards beyond the said abutment bead. At that region of the periphery at which this projection is situated, if an excess pressure builds up in the closed container, air can escape preferably from the inside towards the outside. It is not difficult, by suitable dimensioning of the projection 20, to prevent air from subsequently entering the container from the outside.

At the position 21 indicated in FIG. 10, on the upper side of the cover immediately above the projection 20 it is possible to arrange a mark such as a point or an arrow, for example, by stamping with the use of the sealing head during the working operation in which the cover is applied.

The sealing head illustrated in FIG. 11 comprises a cylindrical guide 23 which is movable in a housing 22 and which carries at its lower end a cylinder flange 24 in which a disc 26 is movable in opposition to the action of the spring 27 by means of a guide rod 25. The cylinder flange is fixed to a kind of cup or basket made of elastic sheet metal 28, which is provided with a plurality of narrow slots 29 which are situated at equal distances from one another over the periphery and which each merge into a round hole 30. This forms individual, independently resilient ring segments 31 which together make up an approximately complete hollow cylinder and whose lower ends 32 are curved outwards in order to be able to grip the cover 11 (not shown). Arranged about the ring segments 31 is a rubber ring 34 which is surrounded externally by a leaf spring (steel strip with its ends placed loosely one over the other) 35. About this there is placed a securing ring 36 with two flanges 37 which can be so connected by bolts as to adjust the width of the securing ring.

Figure 12:
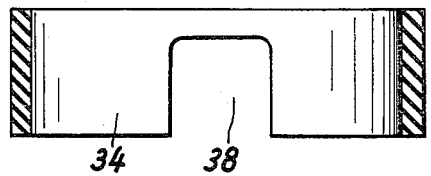
FIG. 12 is a view of an elastic annular strip of rubber adapted to be used in such a sealing head, with the modification to be made thereto in order to carry out the new method.

According to the invention, as shown in FIG. 12, in the angle region of one individual ring segment 31 the elastic annular strip 34 is provided with a substantially U-shaped recess 38 opening towards the mouth of the sealing head. As a result, the ring segment of the sealing head which is situated at the same region of the peripery is given greater yieldability so that when the cover 11 is applied on the container 17 the nose-like projection 20 is produced. On the remainder of the periphery, the side wall of the cover is constricted by means of the other segments 31, without considerable compression in the peripheral direction of the beaded-over rim 16 of the cover side wall having to occur.

It may be advantageous for the elastic annular strip to consist of two separate layers instead of a single layer as shown in FIG. 12. At the right-hand half of FIG. 13, the elastic annular strip 34 is shown as consisting of two layers 34′, 34″, only the inner layer 34′ being provided with a substantially U-shaped recess 38.

The forms shown in FIG. 13 have the result that the ring segment situated in front of the recess can freely be bent outwards to some extent but then encounters elastic resistance, which can be utilized for an appropriate shaping of the nose-like projection 20 on the cover rim.

The reliable, uniform production of cover seals of the kind discussed above, with satisfactory durable sealing as is necessary if the material contained in the containers is to be preserved, requires the fulfilment of certain conditions. In the ideal case, the opening rim of the vessel should be exactly plane. If this is not so then, during the formation of the cover closure, a certain pressure or pre-tensioning of the sealing material in the axial direction is necessary in order that no air must subsequently penetrate from the exterior into the closed vessel. The axial pre-tensioning of the cover must, however, not be so great that it is no longer possible to achieve the necessary valve effect, i.e. the escape of air out of the interior of the vessel, for the purpose of equalizing the inner excess pressure during the preserving process.

In order to facilitate the solution of this problem in practice and to provide an accurately defined valve effect also in the case of relatively strong axial pre-tensioning of the sealing material, there is proposed above an elastic cushioning between the retaining ring and the ring segments of the closure head, which cushioning should have, on at least one point of its periphery, a substantially U-shaped recess for the weakening at this point of the radial resistance of the ring segment or segments disposed adjacent the same. There is then formed, as discussed above a kind of "nose," when the cover is applied, at one point on the periphery of the cover's lateral wall. The sealing force is thus relatively weakened in the zone of this point so that even in the case of a strong axial pressing-on of a cover on a vessel mouth, a satisfactory valve effect is assured.

It may, however, happen that in a large number of glasses, some glasses may have a mouth rim which is depressed along a relatively small sector of its periphery and is so uneven that even an extremely strong axial pressure on the cover will not insure a reliable seal while retaining the desired valve effect.

In order to be able to produce a satisfactory seal in such cases, according to the present invention, the pressure disc has on its side facing the cover one or more concentric annular projections which are elastically resilient and the diameter of which is so selected that, when the cover is applied to a vessel, they contact the cover in the zone opposite the vessel rim and, where necessary, deform it for the purpose of adaptation to possible unevenness of the rim.

In consequence of this measure, the result is achieved that, when the cover is applied on the vessel, it is subjected to a certain twist and is thereby adapted exactly to the unevenness of the rim so that the sealing insert of the cover is subjected over its entire periphery to substantially uniform pressure. It is then an easy matter to provide a satisfactory and durable closure.

Figure 15:
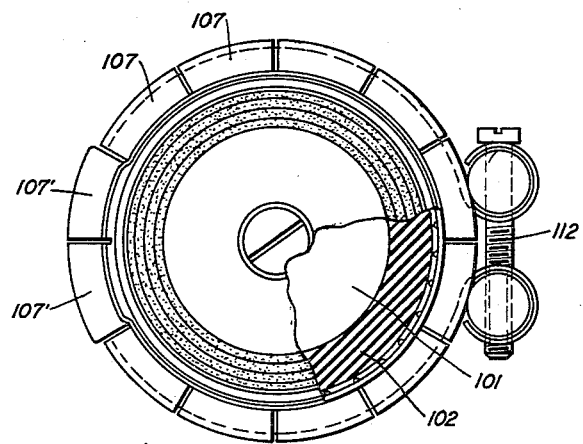
FIG. 15 shows a view from below of a closure head according to the invention.
Figure 16:
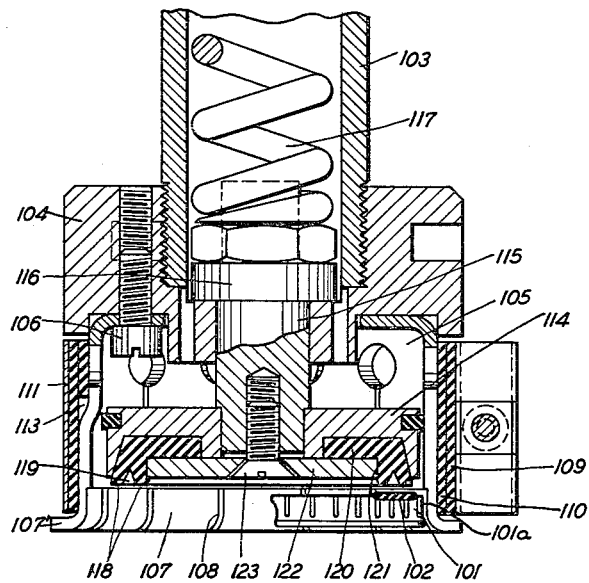
FIG. 16 shows a sectional view of the closure head of this kind.

FIGURES 15 and 16 show a cover (with parts broken away) in the position, which it assumes during its application to a vessel (not shown), within the closure head of the invention. Various forms of such covers with sealing inserts can be used, including those indicated above.

In FIGS. 15 and 16, element 101 is a cover provided with a depending flange 101a, 102 the sealing insert thereof, and 103 the cylindrical guide of the closure head, which consists essentially of a flange 104 carrying the cup or cage 105 secured to it with screws 106. The ring segments 107 separated from each other by slots 108 in the cage 105 are surrounded by an elastic cushion consisting of two concentric bands or rings 109 and 110 of rubber or synthetic plastic material which are held together by a metal bank 111, surrounding these parts, adjustable with respect to its diameter, and provided with a tensioning device 112. The band or ring 110 has a U-shaped recess 113 in the zone of which the two ring segments 107' are able to bend outwardly somewhat further than the remaining segments 107, so that there is formed in their zone a so-called "nose" on the lateral edge of a cover applied on the vessel, this measure resulting in an improved valve effect of the seal 102 at this point on the cover periphery. Axially displaceable in the cup or cage 105 is a pressure disc 114 carried by a stem 115 which is guided in the cylinder 103 by means of a piston 116 which is subjected to the action of a spiral spring 117 the upper end (not shown) of which bears on a part secured to the cylinder 103. The pressure disc 114 has on its side facing the cover 101 one or more annular, resilient projections 118 which are concentric with it and the diameter of which is so selected that, when the cover is applied to the vessel (not shown) they contact the cover 101 in the zone opposite the vessel rim. Consequently, the projections 118 are able to deform the cover for purposes of adaptation to any unevenness in the mouth rim. In the embodiment illustrated, an annular member 120 of resilient material such as rubber or synthetic plastic material, having a central aperture and a downwardly-directed rim 121 on or in which are located the projections 118 and the notch 119, is held in place in the pressure disc 114 by means of a retaining plate 122 and a securing screw 123.

It will be readily understood that when the closure head is pressed down on a glass vessel the mouth rim of which is not entirely planar and upon which the cover 101 is applied, deformation (twisting) of the cover 101 is achieved by means of the resilient projections 118, so that the cover is uniformly adapted to the mouth rim of the vessel over the entire periphery and the same pressing-on force is applied everywhere on the sealing insert 102 of the cover.

In the preparation of preserves without sterilization, wherein valve-like "breathing" of the seal (vacuum seal) is not entirely necessary, the use of the annular, resilient projection according to the invention of the pressure disc in the closure head is also to be advised, since it insures satisfactory sealing over the entire periphery of the vessel rim.

There will now be obvious to those skilled in the art many modifications and variation of the methods and apparatus set forth above. These modifications and variations will not however, depart from the scope of the invention as defined by the following claims.

What is claimed is:

1. For closing the mouth of a vessel having a rim defining said mouth, with a closure having a depending flange, the method comprising: holding the closure against said vessel to close the mouth thereof with said flange encircling the vessel, resiliently urging said closure against said rim to shape said closure to irregularities in said rim to provide substantially air-tight relations between the closure and the rim, encircling said flange with a ring of separately displaceable members, and elastically constricting less than all of said members radially inwardly against said flange to compress the latter against said vessel with the exception of at least one predetermined zone, the thusly constricted flange maintaining the closure against the rim to retain the air-tight relation between the closure and the rim with the exception of the zone whereat excess pressure may be relieved from said vessel.

2. Apparatus for applying to a vessel having a rim defining a mouth, a closure having a depending flange adapted for encircling said vessel adjacent said rim, said apparatus comprising means for holding said closure against said rim to close said mouth in substantially air-tight relation with said flange loosely encircling said vessel, a resilient member positioned between the aforementioned means and said closure, a cage provided with a plurality of slots defining a ring of segments which are individually and elastically deformable and are adapted to encircle said flange and compress the same against the rim, a second ring surrounding said ring of segments and being provided with an opening adjacent at least one of the segments, and means to constrict said second ring against the first said ring to force the flange against the vessel while forming a nose in the flange to enable local discharge of excess pressure in said vessel through said nose.

3. Apparatus as claimed in claim 2 wherein the first said means comprises a piston, and a spring engaging said piston and yieldably urging the same towards said closure.

4. Apparatus as claimed in claim 2 wherein said second ring is of rubber.

5. Apparatus as claim in claim 2 wherein said second ring is of plastic.

6. Apparatus as claimed in claim 2 wherein said opening is a U-shaped recess.

7. Apparatus as claimed in claim 2 wherein said resilient member includes two concentric resilient projections adapted to urge said closure against said rim.

8. Apparatus as claimed in claim 2 wherein said resilient member is a disc including at least one axially extending resilient projection.

9. Apparatus as claimed in claim 8, comprising a rigid disc supporting said resilient member and including an axially extending flange encircling said projection.

10. Apparatus as claimed in claim 9 wherein said rigid disc includes a central portion extending through said resilient member.

References Cited in the file of this patent

UNITED STATES PATENTS

| | | |
|---|---|---|
| 859,912 | Brewington | July 16, 1907 |
| 873,245 | Kirkegaard | Dec. 10, 1907 |
| 1,548,899 | Oyama | Aug. 11, 1925 |
| 1,834,712 | Jovignot | Dec. 1, 1931 |